United States Patent [19]

Wicki

[11] Patent Number: 4,649,194
[45] Date of Patent: Mar. 10, 1987

[54] 1:2 METAL COMPLEXES OF A DISAZO COMPOUND HAVING A 5-HYDROXY-1-(AMINOPHENYL)-PYRAZOLE COUPLING/DIAZO COMPONENT RADICAL AND DISAZO COMPOUND HAVING A 1-AMINO-8-HYDROXYNAPHTHALENE COUPLING/DIAZO COMPONENT

[75] Inventor: Heinz Wicki, Basel, Switzerland

[73] Assignee: Sandoz Ltd., Basel, Switzerland

[21] Appl. No.: 517,766

[22] Filed: Jul. 27, 1983

[30] Foreign Application Priority Data

Jul. 28, 1982 [DE] Fed. Rep. of Germany ....... 3228071

[51] Int. Cl.⁴ ............... C09B 45/00; C09B 45/06; C09B 45/26; D06P 3/32
[52] U.S. Cl. .................. 534/693; 534/582; 534/602; 534/662; 534/678; 534/684; 534/697; 534/698; 534/700
[58] Field of Search ............... 534/697, 699, 700, 693, 534/698, 662, 678, 684

[56] References Cited

U.S. PATENT DOCUMENTS

| | | | |
|---|---|---|---|
| 2,775,581 | 12/1956 | Neier et al. | 534/697 X |
| 3,062,806 | 11/1962 | Biedermann et al. | 534/697 X |
| 3,398,132 | 8/1968 | Dehnert | 260/145 |
| 3,459,727 | 8/1969 | Steiner et al. | 534/697 X |
| 3,625,935 | 12/1971 | Back et al. | 534/697 X |
| 4,013,630 | 3/1977 | Beffa et al. | 534/697 X |
| 4,212,802 | 7/1980 | Vogel et al. | 260/145 |
| 4,358,287 | 11/1982 | Wicki et al. | 8/540 |

FOREIGN PATENT DOCUMENTS 1399296 7/1975 United Kingdom ............... 534/709
2047729 12/1980 United Kingdom ............... 534/709

Primary Examiner—Floyd D. Higel
Attorney, Agent, or Firm—Gerald D. Sharkin; Richard E. Vila; Melvyn M. Kassenoff

[57] ABSTRACT

1:2 Metal complexes of the formula

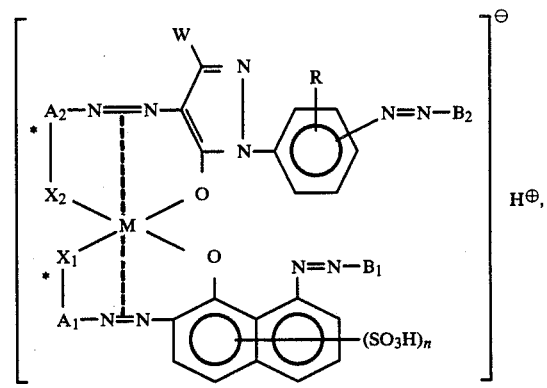

wherein
$X_1$ is —O— or $$-\overset{*}{C}-O-,$$

and
$X_2$ is —O— or $$-\overset{*}{C}-O-,$$

the starred atom being attached $A_1$ or $A_2$, respectively,
$A_1$ is a diazo component radical of the benzene series,
$A_2$ is a diazo component radical of the benzene or naphthalene series,
W is —CH$_3$ or —COOH,
R is hydrogen or —SO$_3$H,
each of $B_1$ and $B_2$ is independently a coupling component radical or a phenolic hydroxy group-containing coupling component radical at least one phenolic hydroxy group of which is etherified or acylated,
M is iron, cobalt or chromium, and
n is 1 or 2,
which complexes are useful as anionic dyestuffs having olive to brown colors for substrates such as natural and regenerated cellulose, natural and synthetic polyamides, polyurethane and anodized aluminum, especially leather.

18 Claims, No Drawings

1:2 METAL COMPLEXES OF A DISAZO COMPOUND HAVING A 5-HYDROXY-1-(AMINOPHENYL)PYRAZOLE COUPLING/DIAZO COMPONENT RADICAL AND DISAZO COMPOUND HAVING A 1-AMINO-8-HYDROXYNAPHTHALENE COUPLING/DIAZO COMPONENT

The invention relates to new 1:2 metal complexes of disazo compounds, their methods of preparation and their use. These complexes are useful as dyestuffs having olive to brown colours.

According to the invention there is provided 1:2 metal complexes, in free acid or salt form, of formula I

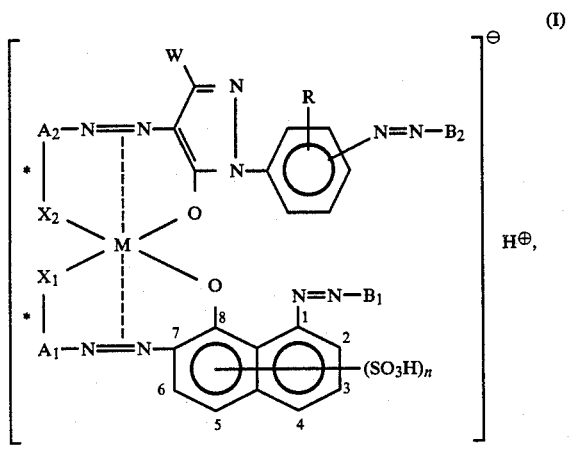

in which
$X_1$ is —O— or

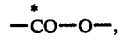
—CO—O—, and
$X_2$ is —O— or

—CO—O—, the starred atom being attached to $A_1$ or $A_2$, respectively,
$A_1$ is a diazo component radical of the benzene series,
$A_2$ is a diazo component radical of the benzene or naphthalene series,
W is —CH$_3$ or —COOH,
R is hydrogen or —SO$_3$H,
each of $B_1$ and $B_2$, independently, is a coupling component radical or a phenolic hydroxy group-containing coupling component radical at least one phenolic hydroxy group of which is etherified or acylated,
M is iron, cobalt or chromium, and
n is 1 or 2,
with the proviso that $X_1$ is ortho to the azo group attached to $A_1$, and $X_2$ is ortho to the azo group attached to $A_2$.

Preferably, —$A_1$—$X_1$— is a group of the formula

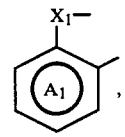

where ring $A_1$ is unsubstituted or substituted by 1 or 2 substituents Y, where each Y, independently, is a conventional substituent for a benzene ring in anionic dyestuff chemistry.

Each Y, independently, is preferably selected from halogen, —NO$_2$, —COOH, C$_{1-4}$alkyl, C$_{1-4}$alkoxy, —SO$_3$H —SO$_2$—NR$_1$R$_2$, where R$_1$ is hydrogen or C$_{1-4}$alkyl, and R$_2$ is hydrogen, C$_{1-4}$alkyl or

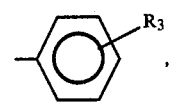

where R$_3$ is hydrogen, halogen, C$_{1-4}$alkyl, C$_{1-4}$alkoxy or —COOH, with the proviso that not more than one substituent is selected from —SO$_3$H and —SO$_2$NR$_1$R$_2$. Preferably, not more than one Y is selected from carboxy, alkyl and alkoxy and preferably not more than one Y is selected from halogen atoms. Preferably, when —SO$_2$NR$_1$R$_2$ is present, there is no further substituent on ring $A_1$ other than $X_1$.

When R$_2$ is a group of the formula

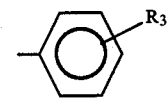

preferably R$_1$ is hydrogen.
Preferably, R$_1$ is R$_1'$, where R$_1'$ is hydrogen or methyl. More preferably, R$_1$ is hydrogen.
Preferably, R$_2$ is R$_2'$, where R$_2'$ is hydrogen, methyl or

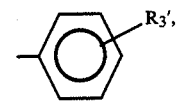

where R$_3'$ is defined below. More preferably, R$_2$ is R$_2''$, where R$_2''$ is methyl or

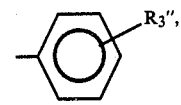

where R$_3''$ is defined below.
Preferably, R$_3$ is R$_3'$, where R$_3'$ is hydrogen, chloro, methyl, methoxy or carboxy. More preferably, R$_3$ is R$_3''$, where R$_3''$ is hydrogen or —COOH.

In this specification, any C$_{1-4}$alkyl group is preferably methyl or ethyl, more preferably methyl, any C$_{1-4}$alkoxy group is preferably methoxy or ethoxy, more preferably methoxy, and any halogen is fluorine, chlorine, bromine or iodine, more preferably chlorine or bromine, and most preferably chlorine. Preferably, any cycloalkyl is cyclohexyl, unsubstituted or substituted by 1 to 3 $C_{1-4}$alkyl groups, more preferably having a total of not more than 10 carbon atoms; most preferably, cycloalkyl is unsubstituted cyclohexyl.

For the avoidance of doubt, where a symbol appears more than once in a formula in this specification, its significances are independent of one another.

More preferably —$A_1$—$X_1$— is a group of formula II or III

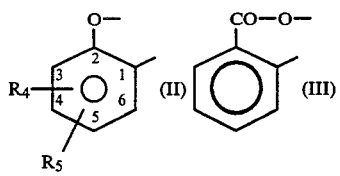

in which $R_4$ is hydrogen, chloro, —$NO_2$, —$SO_3H$ or —$SO_2NR_1'R_2'$, and $R_5$ is hydrogen, chloro, —$NO_2$, —$SO_3H$ or —COOH, with the proviso that not more than one of $R_4$ and $R_5$ is selected from —$SO_3H$ and —$SO_2NR_1'R_2'$.

Preferably, $R_4$ is $R_4'$, where $R_4'$ is chloro, —$NO_2$, —$SO_3H$ or —$SO_2NR'_1R'_2$, with the proviso that when $R_4'$ is —$SO_2NR'_1R'_2$, $R_5$ is hydrogen, and when $R_4'$ is —$SO_3H$, $R_5$ is hydrogen, chloro, —$NO_2$ or —COOH.

Preferably, $R_4$ is in the 5-position, and $R_5$ is in the 3- or 4-position.

Most preferably, —$A_1$—$X_1$— is a group of formula II defined above.

Preferably, $X_1$ is oxygen.

Preferably, the group —$A_2$—$X_2$— is a group of formula IV or V

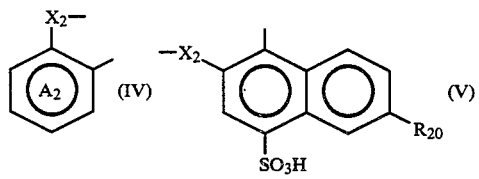

where $R_{20}$ is hydrogen or, preferably, —$NO_2$ and the benzene ring $A_2$ (of formula IV) is unsubstituted or substituted by 1 or 2 substituents Y defined above (independently of the significances of Y attached to $A_1$). The preferences for Y for ring $A_1$ set forth above also apply to ring $A_2$.

Preferably, the group of formula IV is of formula IV' or $IV_a$

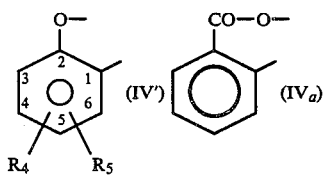

where $R_4$ and $R_5$ are as defined above.

Preferably, in formula IV', $R_4$ is in the 5-position, and $R_5$ is in the 3- or 4-position. Also preferably, the group of formula IV is of formula IV', more preferably with the preferences of the preceding sentence.

Preferably, $X_2$ is oxygen,

When W is methyl, R is preferably hydrogen. When R is —$SO_3H$, W is preferably —COOH. When R is —$SO_3H$, it is preferably in an ortho position to the pyrazole group.

Preferably, W is —$CH_3$.

Preferably, the group —N=N—$B_2$ is in a meta or para position to the pyrazole group.

Preferably, in the complexes of formula I, the —$SO_3H$ group attached to the naphthalene group to which —N=N—$B_1$ is attached is in position 4 or 6 when n=1 and the —$SO_3H$ groups are in positions 3,6, 4,6 or 3,5, preferably 3,6 or 4,6, when n=2.

Each of $B_1$ and $B_2$, independently of the other, is preferably a coupling component radical of the benzene, naphthalene, heterocyclic or non-cyclic (open chain) active methylene series, as is conventional in the art of anionic dyestuffs, or a phenolic hydroxy group-containing coupling component radical of the benzene series at least one phenolic hydroxy group of which is etherified or acylated.

When $B_1$ or $B_2$ is of the heterocyclic series, it is preferably of the pyrazolone, aminopyrazole, pyridone, pyrimidone or oxyquinoline series; in particular, it is a group of formula VI, VII, VIII or IX

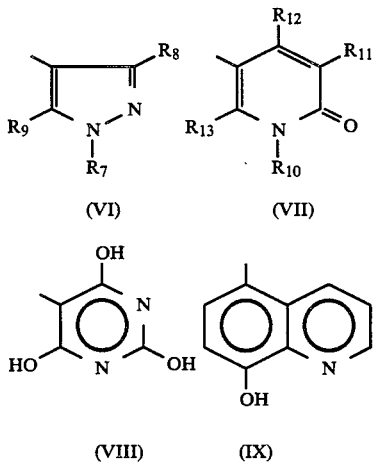

in which $R_7$ is hydrogen or a group of formula X or XI

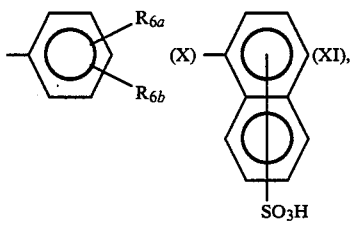

wherein $R_{6a}$ is hydrogen, Cl, methyl, methoxy, —CN, —$NO_2$, —COOH, —$SO_2N(R_{7a})_2$ or —$SO_3H$, where each $R_{7a}$, independently, is hydrogen, $C_{1-4}$alkyl or $C_{2-4}$alkyl monosubstituted in the 2-, 3- or 4-position by —OH or $C_{1-4}$alkoxy, and -, 3- or $R_{6b}$ is hydrogen, Cl, methyl, methoxy or carboxy, $R_8$ is $C_{1-4}$alkyl, unsubstituted phenyl, —COOH or —CON($R_{7a}$)$_2$, where $R_{7a}$ is defined above, $R_9$ is —OH or —$NH_2$, $R_{10}$ is hydrogen; —$NH_2$; phenylamino; a group of formula X or XI; $C_{1-8}$alkyl; $C_{2-4}$alkyl monosubstituted in the 2-, 3- or 4-position by hydroxy, methoxy, ethoxy, chloro or —SO$_3$H; cyclohexyl; cyclohexyl substituted by 1 to 3 C$_{1-4}$alkyl groups, the substituted cyclohexyl group having a total of 7 to 10 carbon atoms, inclusive, or carboxy-C$_{1-4}$alkyl, R$_{11}$ is hydrogen, carboxy, sulpho, —COCH$_3$ or —CN, R$_{12}$ is hydrogen, hydroxy, methyl, carboxy, phenyl or —CH$_2$—SO$_3$H, and R$_{13}$ is hydrogen, hydroxy or methyl, with the proviso that at least one of R$_{12}$ and R$_{13}$ is hydroxy.

When B$_1$ or B$_2$ is of the non-cyclic active methylene series, it is preferably an acetoacetic acid ester or amide radical. More preferably, the coupling component radical is a group of formula XII

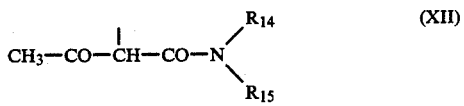

in which

R$_{14}$ is hydrogen or C$_{1-4}$alkyl, and

R$_{15}$ is C$_{1-8}$alkyl, cyclohexyl, cyclohexyl substituted by 1 to 3 C$_{1-4}$alkyl groups, the substituted cyclohexyl group having a total of 7–10 carbon atoms, inclusive, or a group of formula X or XI defined above.

When B$_1$ or B$_2$ is of the benzene series, it is preferably a group of formula XIII or XXVI, more preferably XIII,

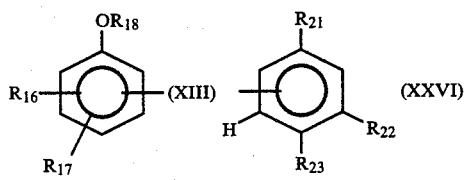

in which

R$_{16}$ is hydrogen, C$_{1-4}$alkyl, C$_{1-4}$alkoxy or halogen,

R$_{17}$ is hydrogen or C$_{1-4}$alkyl,

R$_{18}$ is hydrogen, C$_{1-4}$alkyl or acyl,

R$_{21}$ is amino or hydroxy,

R$_{22}$ is amino or hydroxy, and

R$_{23}$ is hydrogen or methyl, with the proviso that R$_{23}$ may be methyl only when R$_{21}$ and R$_{22}$ are both amino.

When B$_1$ or B$_2$ is of the naphthalene series, it is preferably a β-naphthol, 2-naphthol-3-carboxylic acid or β-naphtholmonosulphonic acid (preferably 2-naphthol-6- or 7-sulphonic acid) coupling component radical, i.e., a group of formula XXVII

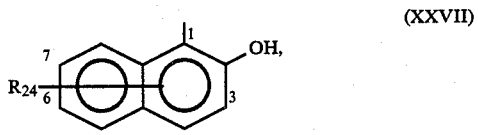

wherein

R$_{24}$ is hydrogen, 3-carboxy or sulfo, preferably hydrogen, 3-carboxy or 6- or 7-sulfo.

R$_7$ is preferably R$_7'$, where R$_7'$ is a group of formula X,

R$_{6a}$ is preferably R$_{6a}'$, where R$_{6a}'$ is hydrogen, Cl, —NO$_2$ or —SO$_3$H.

R$_{6b}$ is preferably hydrogen.

Preferably, R$_{7a}$ is R$_{7a}'$ where each R$_{7a}'$, independently, is hydrogen or methyl.

Preferably, R$_8$ is R$_8'$, where R$_8'$ is methyl or carboxy, more preferably methyl.

Preferably, R$_9$ is hydroxy.

Preferably, R$_{10}$ is R$_{10}'$, where R$_{10}'$ is hydrogen, C$_{1-4}$alkyl, cyclohexyl or a group of formula X, defined above; more preferably, R$_{10}$ is R$_{10}''$, where R$_{10}''$ is hydrogen or C$_{1-4}$alkyl, most preferably the former.

Preferably, R$_{11}$ is R$_{11}'$, where R$_{11}'$ is sulpho or —CN, more preferably the latter.

Preferably, R$_{12}$ is methyl.

Preferably, R$_{13}$ is hydroxy.

Preferably, R$_{14}$ is hydrogen.

Preferably, R$_{15}$ is a group of formula X.

Preferably, R$_{16}$ is R$_{16}'$ where R$_{16}'$ is hydrogen, methyl, methoxy or chloro; more preferably, R$_{16}$ is methoxy.

Preferably, R$_{17}$ is hydrogen or methyl, more preferably the former.

Preferably, R$_{18}$ is R$_{18}'$, where R$_{18}'$ is hydrogen, C$_{1-4}$alkyl, benzoyl, phenylsulphonyl, tolylsulphonyl or (C$_{1-4}$alkyl)carbonyl; more preferably, it is hydrogen.

When R$_7$ or R$_{10}$ is a group of formula X, preferably R$_{6a}$ is hydrogen or —SO$_3$H, and R$_{6b}$ is preferably hydrogen. When R$_{15}$ is a group of formula X, preferably R$_{6a}$ is hydrogen, methyl or methoxy, more preferably hydrogen, and R$_{6b}$ is preferably hydrogen.

Any coupling component radical of formula XIII is preferably of formula XIIIa

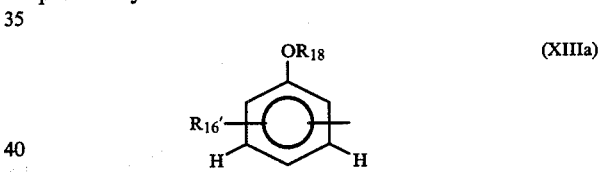

In formula XIIIa, R$_{18}'$ is preferably hydrogen.

Of the above coupling component radicals B$_1$ and B$_2$, the non-cyclic active methylene and heterocyclic coupling component radicals are preferred, especially the latter.

Of the coupling component radicals of formulae VI to IX, those of formulae VI, VII and IX are preferred, those of formulae VI and VII are more preferred, and those of formula VI are most preferred.

Preferred coupling component radicals of formula VI are of formula VI$_a$

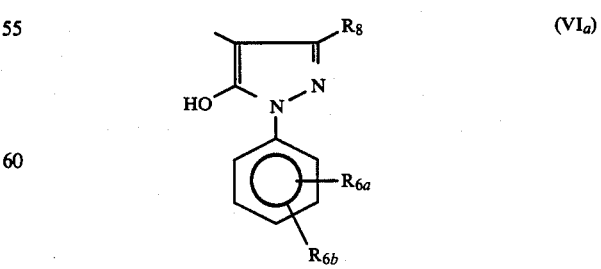

where the symbols are defined above, and preferred coupling component radicals of formula VII are of formula VII$_a$

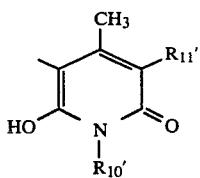

where $R_{10}'$ and $R_{11}'$ are defined above.

Preferably, M is cobalt or chromium, more preferably chromium.

Preferably, n is 2 and the two sulpho groups on the naphthalene ring are in the 3- and 6-positions.

Preferred metal complexes of formula I, in free acid or salt form, are of formula $I_a$

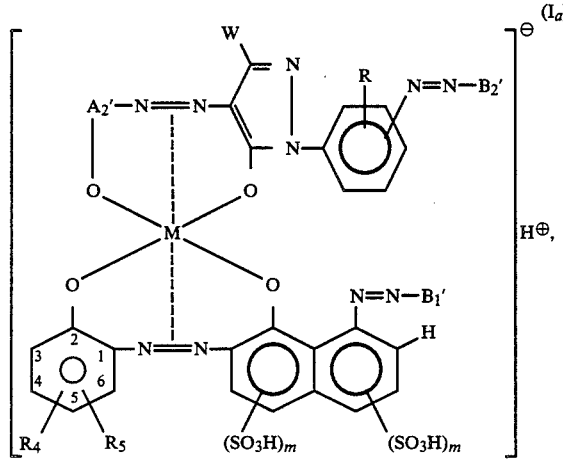

in which

is a group of formula IV' or formula XIV

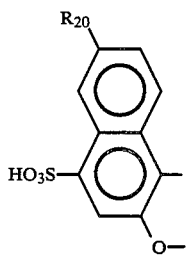

in which $R_{20}$ is hydrogen or $-NO_2$ (preferably $-NO_2$), $B_1'$ and $B_2'$, independently, are groups selected from those of formulae VI to IX and XII defined above, and each m independently is 0 or 1, of which at least one of the m's is 1.

Preferably, in the complexes of formula $I_a$, both m's are 1 and the sulpho groups are in the 3- and 6-positions of the naphthalene rings, each $R_4$ is in the 5-position of the ring to which it is attached, each $R_5$ independently is in the 3- or 4-position of the ring to which it is attached, R is hydrogen, W is methyl, and M is cobalt or chromium, especially the latter. Each of these preferences is independent of the others.

Preferred complexes of formula $I_a'$, in free acid or salt form, are of formula $I_a'$

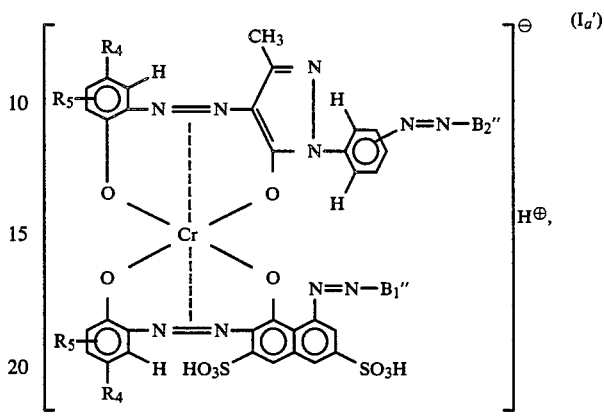

in which $B_1''$ and $B_2''$, independently, are coupling component radicals selected from those of formulae VI to IX and the other symbols are as defined above. The preferences set forth above with respect to $R_4$, $R_5$ and the groups of formulae VI–IX are preferences for the complexes of formula $I_a'$.

More preferred complexes of formula $I_a$, in free acid or salt form, are of formula $I_a''$

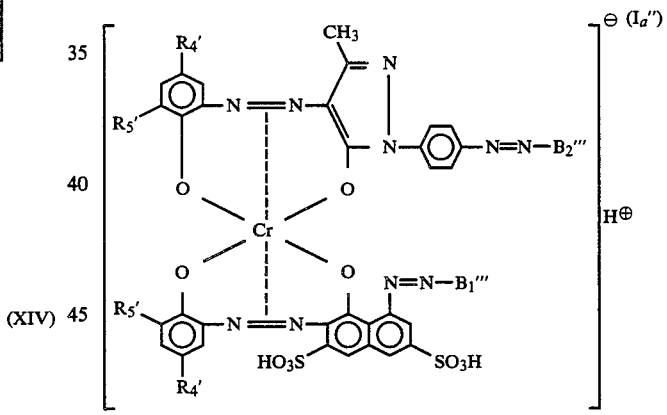

in which each $R_4'$ independently is selected from Cl, $-SO_3H$, $-NO_2$ and $-SONR_1'R_2'$, each $R_5'$ independently, is selected from hydrogen, $-NO_2$ and $-SO_3H$, and $B_1'''$ and $B_2'''$, independently, are selected from groups of formulae XV and XVI

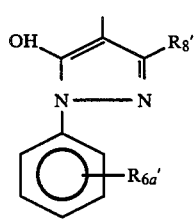

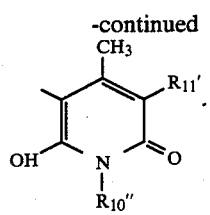
(XVI)

in which
R$_8'$ is methyl or carboxy,
R$_{6a}'$ is hydrogen, Cl, —NO$_2$ or —SO$_3$H,
R$_{10}''$ is hydrogen or C$_{1-4}$alkyl, and
R$_{11}'$ is —CN or —SO$_3$H,
with the provisos that
(i) a maximum of one of the R$_4''$s is —SO$_3$H,
(ii) a maximum of one of the R$_5''$s is —SO$_3$H,
(iii) if, on a particular ring, R$_4'$ is —SO$_2$NR$_1'$R$_2'$, the R$_5'$ on the same ring is hydrogen, and
(iv) if, on a particular ring, R$_4'$ is —SO$_3$H, the R$_5'$ on the same ring is hydrogen or —NO$_2$.

Preferred complexes of formula I$_a''$ are those in which B$_1'''$ and B$_2'''$, independently, are groups of formula XV$_a$

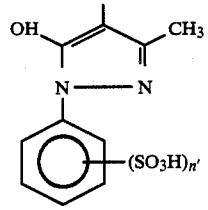
(XV$_a$)

where n' is 0 or 1.

The complexes of this invention, e.g., those of formulae I, I$_a$, I$_a'$ and I$_a''$, are in free acid or, preferably, salt form. By "salt form" is meant that at least one sulpho group of the complex is in salt form, any other sulpho groups and any carboxy groups being in free acid or salt form and the negative charge of the complexed metal ion being balanced by hydrogen or a cation. The cations are preferably non-chromophoric. Suitable cations for the salt form include those non-chromophoric cations common in anionic metal complex dyes. Representative cations include the alkali metal (e.g., lithium, sodium and potassium), alkaline earth metal (e.g., magnesium and calcium) and ammonium and substituted ammonium (e.g., of the formula (R$_{25}$)$_4$N$^\oplus$, wherein each R$_{25}$ is independently hydrogen, C$_{1-3}$alkyl or 2-, 3- or 4-hydroxy(C$_{2-4}$alkyl), with the proviso that when any R$_{25}$ is 2-, 3- or 4-hydroxy(C$_{2-4}$alkyl), at least one R$_{25}$ is hydrogen, such as ammonium, mono-, di-, tri- and tetra-methylammonium, mono-, di-, tri-ethylammonium, mono-, di- and tri-ethanolammonium and mono-, di- and tri-isopropanolammonium) cations. The preferred cations are ammonium, lithium, sodium and potassium, with sodium being most preferred. It should be understood that when the cation is other than monovalent, it balances the charge of more than one monovalent anionic group. When a complex contains two or more cations, they may be the same or different but are preferably the same.

Preferably, the complexes of the invention contain 1 to 5 sulpho groups. Preferably, the azopyrazolone complexing compound has 0 to 2 sulpho groups (more preferably 0 or 1) and the azoaminonaphthol complexing compound has 1 to 4, preferably 2 or 3, sulpho groups. More preferably, the complexes of the invention contain 2 to 4 sulpho groups.

A further aspect of the invention is a process for the preparation of a complex of formula I comprising coupling a diazotised complex of formula XVIII (in free acid form)

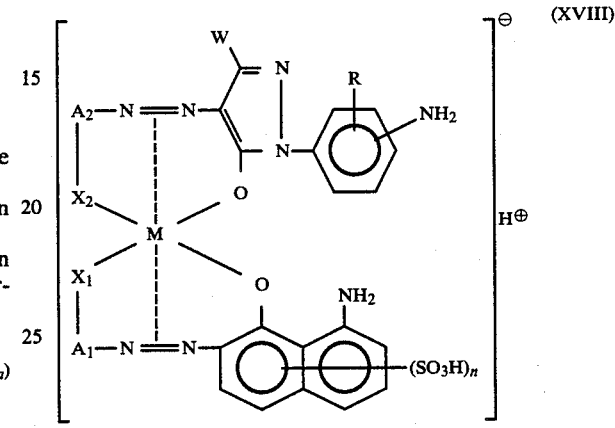
(XVIII)

with a compound of formula XX and a compound of formula XXI

H—B$_1$ (XX)

H—B$_2$ (XXI)

or a diazotised complex of formula XIX (in free acid form)

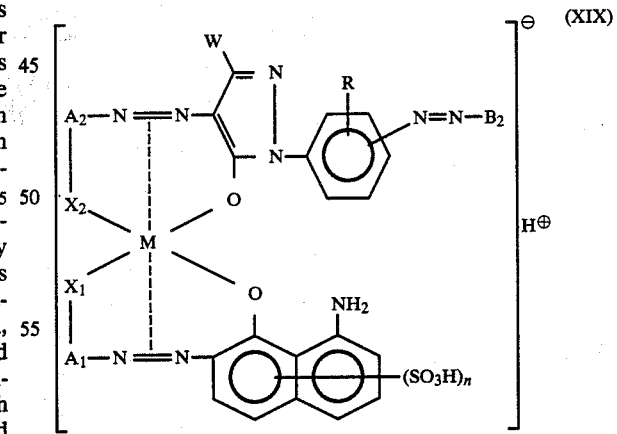
(XIX)

where B$_2$ does not contain any diazotisable amino group, with a compound of the formula XX.

The symbols are all defined above and the reaction can be carried out by known methods.

Complexes of formula XVIII can be prepared by complexing a compound of formula XXII

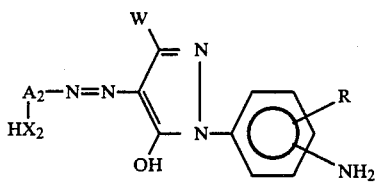

(XXII)

and a compound of formula XXIII

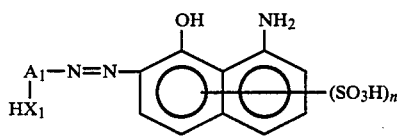

(XXIII)

with a metal-donating compound, where the metal is iron, cobalt or chromium.

Complexes of formula XIX can be prepared in a similar fashion.

Compounds of formulae XXII and XXIII are known or can be prepared according to known methods. Complexing is carried out according to known methods.

Alternatively, one can complex a compound of formula XXIV

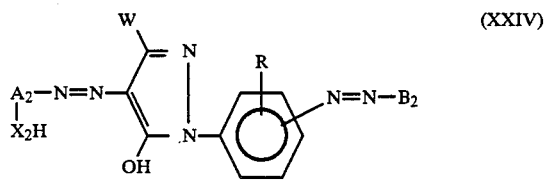

(XXIV)

and a compound of formula XXV

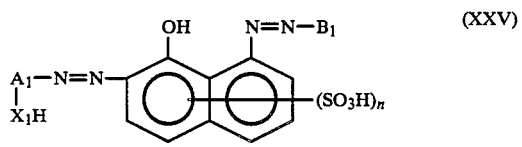

(XXV)

with an iron-, chromium- or cobalt-containing compound.

Depending on the complexing metal and conditions employed, asymmetric 1:2 metal complexes are formed or mixtures of asymmetric 1:2 metal complexes are formed. Mixtures of asymmetric complexes of formula I together with symmetric complexes, in which each dyestuff unit is one or the other of the two dyestuff units of the complexes of formula I (those of formulae XXIV and XXV), may be formed according to known methods.

To prepare single (as opposed to mixtures of) asymmetric chromium and cobalt complexes, it is preferred to react a 1:1 metal complex of a compound of formula XXII with a metal-free compound of formula XXIII, a 1:1 metal complex of a compound of formula XXIII with a metal-free compound of formula XXII or a 1:1 metal complex of a compound of formula XXIV with a metal-free compound of formula XXV as, for example, in Examples I–III.

The complexes of this invention wherein $B_1$ and/or $B_2$ is a phenolic hydroxy group-containing coupling component radical having at least one etherified or acylated phenolic hydroxy group are preferably synthesized by etherifying or acylating the corresponding phenolic hydroxy group-containing metal complex (e.g., of formula I, XVIII or XIX) or metal-free compound of formula XXIV or XXV. Etherification and acylation may be carried out by known methods. For example, $C_{1-4}$alkyl ethers may be prepared by alkylating the phenolic hydroxy group with a $C_{1-4}$alkyl halide or di($C_{1-4}$alkyl)sulphate. Acylating agents include $C_{1-4}$alkyl (e.g., methyl and ethyl) carbonyl halides (e.g., chlorides and bromides) and anhydrides, benzoyl chloride, bromide and anhydride, phenylsulfonyl chloride and toluenesulfonyl chloride.

The metal complexes of formula I are useful as dyestuffs, particularly as dyestuff preparations, for dyeing anionically dyeable substrates. Dyeing compositions can be made up containing a complex of formula I as the dyestuff and one or more further additives as coupage (for example, NaCl, $Na_2SO_4$, sodium carbonate or dextrin), antifoam agents, products to modify the solubility of the dyestuff in aqueous medium or further dyestuffs that are compatible with the complexes of formula I.

Substrates to which the complexes of formula I may be applied are substrates such as natural or regenerated cellulose, natural or synthetic polyamide, polyurethane and anodised aluminum. The substrate can be in textile or nontextile form, for example as fibres, filaments, threads, knitted materials, webs, half-finished or finished articles such as fleece material, felts, carpets, leather, wool-skins and sized paper.

Preferred substrates are natural and synthetic polyamides, in particular natural polyamide such as silk, wool, leather, wool-skins, fur skins and most preferably leather. Leather is preferably tanned, for example, vegetable tanned, synthetically tanned, chrome or combined tanned.

The dyestuffs of the invention preferably can be exhausted, impregnated or padded onto the substrate. In such processes the amount of dyestuff used is up to the saturation point of the substrate. Preferred concentration of dyestuffs used are 0.001 to 10%, preferably 0.01 to 5%, of pure dyestuff based on the dry weight of the substrate to which the dyestuff is to be applied.

The metal complexes of the present invention provide a wide range of brown dyes and this in turn enables a wide variety of brown nuances to be produced, particularly on leather.

The brown nuances (especially on leather) range from a neutral brown to a yellowish-brown to a reddish-brown and to a greenish-brown. Particularly good dyes are those in the range of yellow dark brown to dark olive brown. Complexes of formula I in which the metal is chromium and $B_1$ and $B_2$ are non-homocyclic groups (for example, heterocyclic and non-cyclic active methylene groups defined above) will produce dyeings in the latter colour range.

The dyeings so produced have excellent fastness properties, in particular light fastness. The dyes of the invention exhibit good build-up and the dyeings so produced are level. Furthermore, the wet fastness of leather is very good.

Of particular relevance is the combinability of the complexes of the invention, mainly those with more than one hydrosolubilizing substituent, with other anionic dyes in 1:1 or 1:2 metal complex form.

In the following examples, all parts and percentages are by weight, all temperatures are in degrees Centigrade, and all parts by volume relate to parts by weight as ml to g.

EXAMPLE I (a) Preparation of a 1:1 chromium complex.

21.8 Parts of picramic acid are stirred into 50 parts of water, and the pH is brought to 7 by adding a suitable amount of 30% sodium hydroxide solution. To this mixture 31 parts by volume of a 4N sodium nitrite solution are added. The reaction mixture is brought to a temperature of 0° to 5° by the addition of 100 parts of ice, followed by diazotising through the addition of 23 parts by volume of 30% hydrochloric acid.

31.9 Parts of H acid are stirred with 100 parts of water and this solution is brought ot a pH of 9.7 by the addition of 16 parts by volume of 30% sodium hydroxide solution. After the addition of 50 parts of ice, the diazo reaction mixture formed above is added and the pH of the resulting mixture is brought to a pH of 9 by the addition of a suitable amount of 30% sodium hydroxide solution. Coupling then is started and is completed at a pH of 12.5 and at a temperature of 0° to 5°.

The resulting reaction mixture is diluted with 400 parts of water and the pH is reduced to 2 by the addition of a suitable amount of 30% hydrochloric acid, after which 29.3 parts of chromium trichloride hexahydrate is added and the pH of the mixture is brought to 1.5 by the addition of a suitable amount of 30% hydrochloric acid.

The reaction mixture is heated to 102°-104° and allowed to react at this temperature for 5 to 8 hours. The progress of the reaction can be followed using thin layer chromatography. After completion of the reaction, the mixture is cooled to 50°.

(b) Preparation of the 1:2 chromium complex 16.9 Parts of 1-amino-2-hydroxy-5-nitrobenzene are stirred with 50 parts of water and are brought into solution by the addition of 28 parts of a 30% hydrochloric acid solution. After the addition of 40 parts ice, diazotisation is carried out by the addition of 28 parts by volume of a 4N sodium nitrite solution at a temperature of 0° to 5°.

18.9 Parts of 1-(4'aminophenyl)-3-methyl-5-pyrazolone are stirred into 100 parts of water and are brought to a pH of 8 by the addition of 16 parts by volume of a 30% sodium hydroxide solution. The temperature is brought to 0° to 5° by the addition of ice and at this temperature the diazo solution formed above is added. The pH is held at 8 by the addition of a suitable amount of 30% sodium hydroxide solution and the reaction is left to run overnight. The resulting orange suspension of the monoazo dyestuff is poured slowly into the reaction mixture (1:1 chromium complex) formed in part (a) above. The temperature is then brought to 80° slowly and the pH is brought to 5 by the addition of a suitable amount of disodium phosphate, followed by the addition of a suitable amount of sodium carbonate to bring the mixture to a pH of 8. The mixture is allowed to react for 2 hours at 80° after which the mixture is cooled to 60° and the dyestuff is precipitated out by the addition of 260 parts NaCl and 77 parts by volume of a 30% hydrochloric acid solution. The precipitated product is filtered by suction.

The resulting chromium complex is of formula 1

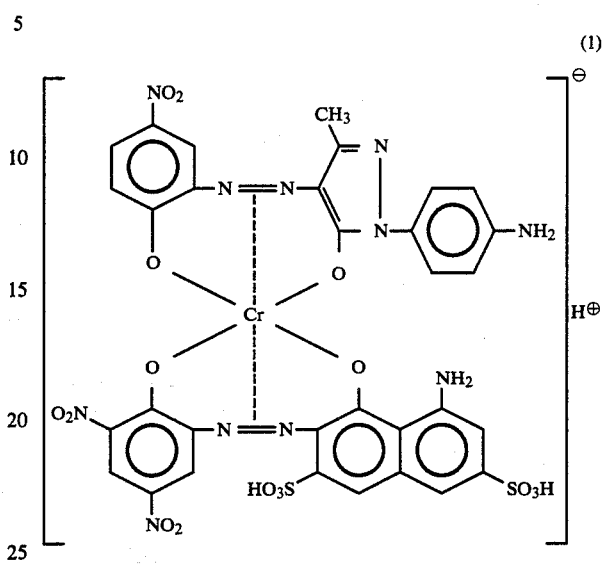

and is in the form of the sodium salt.

(c) Preparation of the disazo complex

625 Parts of the filter cake prepared in part (b) above are stirred into 300 parts of water at 20°, and the pH is adjusted to 8 by the addition of a suitable amount of 30% sodium hydroxide solution. After the addition of 50 parts by volume of 4N sodium nitrite solution and 100 parts of ice, diazotisation is carried out by the addition of 60 parts by volume of a 30% hydrochloric acid solution at 0° to 5°.

34.8 Parts of 3-methyl-1-phenyl-5-pyrazolone are dissolved in 43 parts by volume of a 30% sodium hydroxide solution and 50 parts by volume of water at 20°, and the resulting solution is immediately added to the suspension of the bis-diazotised complex whilst the pH is held at 8 and the temperature is held under 20°. After reacting for 5 hours, the dyestuff is salted out, the precipitated material is suction filtered and the filter cake is dried at 100° C.

The resulting dyestuff is given in Table 1 as Example 1 and is a yellow-dark brown dyestuff which dyes leather in deep and level nuances. The dyeings so produced are light fast.

EXAMPLE II (a) Preparation of 1:1 chromium complex.

The 1:1 chromium complex formed is the same as that of Example I part (a) and is prepared by the same method.

(b) Preparation of 1:2 chromium complex.

The monoazo compound prepared in part (b) of Example I from 1-amino-2-hydroxy-5-nitrobenzene and 1-(4'-aminophenyl)-3-methyl-5-pyrazolone is diazotised using sodium nitrite and hydrochloric acid and finally is coupled to 25 parts of 3-methyl-1-(4'-sulphophenyl)-5-pyrazolone. The resulting disazo dyestuff is mixed with the 1:1 chromium complex from Example (Ib) and reacted at 80° (in a manner analogous to that of Example (Ib). The resulting complex is of formula (2)

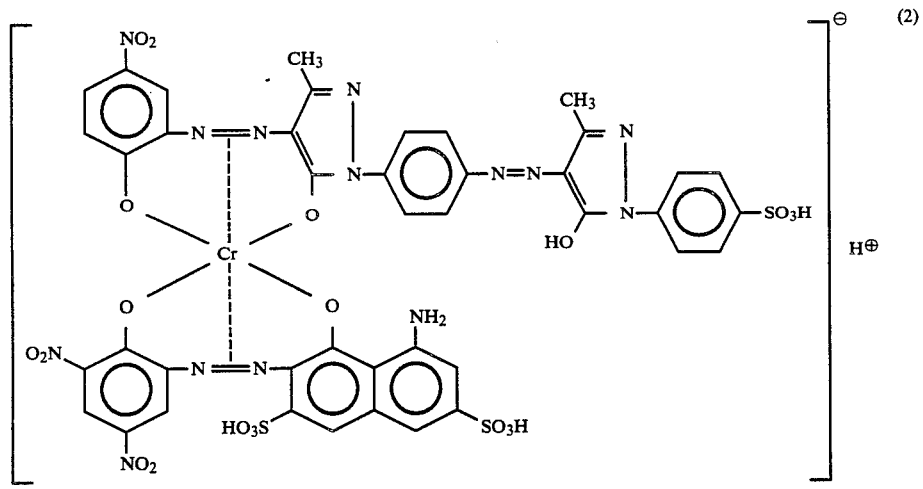

and is in the form of the sodium salt.

(c) Preparation of 1:2 chromium complex containing two disazo units.

The 1:2 chromium complex prepared according to part (b) above is diazotised and at a pH of 8 coupled to 17.4 parts of 3-methyl-1-phenyl-5-pyrazolone analogously as described in Example (Ic). The resulting dyestuff is isolated as described in Example I. The dyestuff produced is of Example 219 given in Table 1 below and is in the form of the sodium salt. It dyes leather a yellowish-brown level saturated tone, and the dyeing has good light fastness properties.

EXAMPLE III

The procedure of Example I is carried out except that instead of 34.8 parts of 3-methyl-1-phenyl-5-pyrazolone a mixture of 17.4 parts of 3-methyl-1-phenyl-5-pyrazolone and 25 parts of 3-methyl-1-(4'-sulphophenyl)-5-pyrazolone (mole ratio of the two coupling components is 1:1) is employed. The resulting dyestuff is the same as that of Example 212 in Table 1 below. The dyeing produced is light fast and yellow-brown in colour with even tone.

Compounds of Examples 1 to 225 are of formula 3

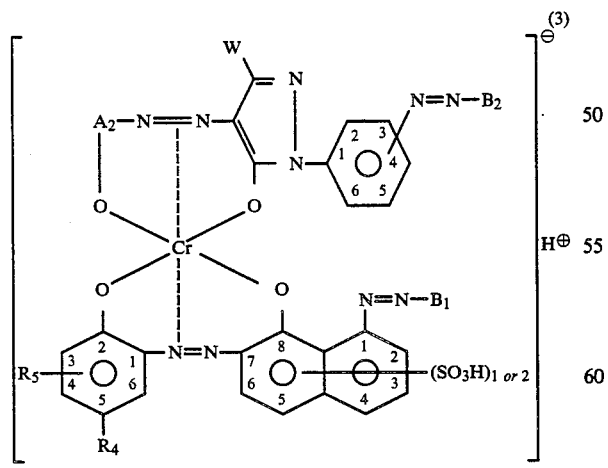

in which the symbols are defined in Table 1 below.

The complexes of Examples 1 to 211 can be prepared by a method analogous to that of Example I; each complex of Examples 219 to 225 may be made by a method analogous to Example II, and Examples 212 to 218 may be made by a method analogous to Example III.

The group

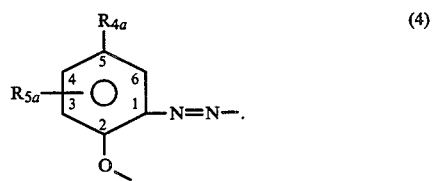

is a group of formula (4)

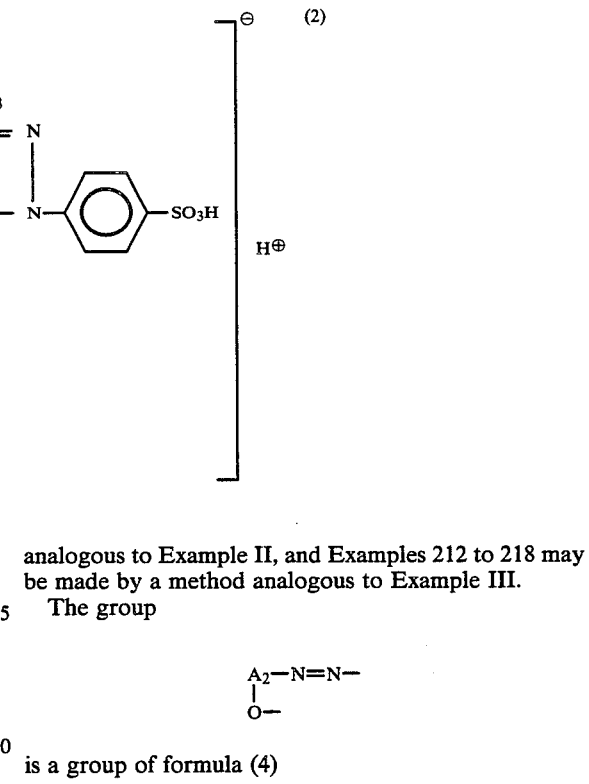

Complexes of the invention may also be prepared in an analogous manner to the above in which $$A_2-N=N-$$
$$|$$
$$O-$$

is a group of formula (5)

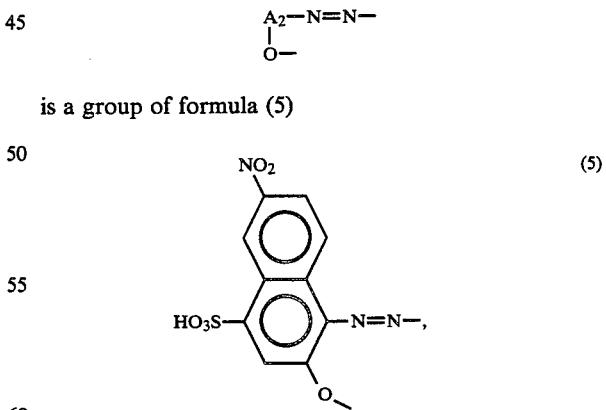

Where, in Table 1 below, in the $R_{4a}$ and $R_{5a}$ columns there are only hyphens, this means that $-O-A_2-N=N-$ corresponds to formula (5); otherwise, it corresponds to formula (4) with the indicated significances and positions.

In Table 1 below, with reference to the sulpho groups on the naphthylene group, where, in an Example, two numbers are given, this indicates that two sulpho groups are present in the positions defined by the numbers and where only one number is given, this indicates that only one sulpho group is is present in the position defined by that number.

In Examples 212 to 218, mixtures of complexes are formed and it is not clear which group is $B_1$ and which is $B_2$. However, in Examples 219 to 225 it is reasonably clear which group is $B_1$ and which is $B_2$ because of the procedure (Example II) used to prepare these complexes.

Each of the complexes of Examples 1–229 is in sodium salt form. However, each complex may, by conventional means, be converted into free acid form and into other salt forms each cation of which is, for example, another (preferably monovalent) non-chromophoric cation (at least one cation being other than sodium).

TABLE 1

| EX. No. | R$_4$ | R$_5$ (position) | R$_{4a}$ | R$_{5a}$ (position) | W | pos. —SO$_3$H on naph. | pos. of —NNB$_2$ | B$_1$ and B$_2$ | Shade on leather |
|---|---|---|---|---|---|---|---|---|---|
| 1 | —NO$_2$ | (3)-NO$_2$ | —NO$_2$ | H | —CH$_3$ | 3,6 | 4 | H$_3$C—[pyrazolone with N-phenyl, OH, CH$_3$] | brown |
| 2 | " | " | " | H | " | 4,6 | 4 | " | brown |
| 3 | " | " | " | H | " | 6 | 4 | " | brown |
| 4 | " | " | " | H | " | 4 | 3 | " | olive-brown |
| 5 | " | " | —SO$_3$H | — | " | 3,6 | 4 | " | dark-brown |
| 6 | " | " | " | H | " | 3,6 | 4 | " | brown |
| 7 | " | " | " | H | " | 4,6 | 4 | " | " |
| 8 | " | " | " | H | " | 6 | 4 | " | " |
| 9 | " | " | —NO$_2$ | H | " | 4 | 3 | " | olive-brown |
| 10 | " | " | " | H | —COOH | 3,6 | 4 | " | brown |
| 11 | " | " | " | H | —CH$_3$ | 3,6 | 4 | " | " |
| 12 | " | " | " | (3)-SO$_3$H | " | 4,6 | 4 | " | " |
| 13 | " | " | —SO$_3$H | " | " | 6 | 4 | " | " |
| 14 | " | " | " | (3)-NO$_2$ | " | 3,6 | 4 | " | olive-brown |
| 15 | " | " | " | " | " | 3,6 | 3 | " | brown |
| 16 | " | " | " | " | " | 4,6 | 4 | " | " |
| 17 | " | " | —NO$_2$ | " | " | 6 | 4 | " | " |
| 18 | " | (3)-SO$_3$H | " | H | " | 4 | 3 | " | olive-brown |
| 19 | " | (3)-NO$_2$ | " | H | " | 3,6 | 4 | " | brown |
| 20 | " | " | " | H | " | 3,6 | 4 | " | " |
| 21 | " | H | " | H | " | 4,6 | 4 | " | " |
| 22 | " | H | " | H | " | 6 | 4 | " | " |
| 23 | " | H | " | H | " | 4 | 3 | " | olive-brown |
| 24 | " | H | " | H | " | 3,6 | 4 | " | brown |
| 25 | —SO$_3$H | " | " | H | " | 3,6 | 4 | " | " |
| 26 | " | " | " | H | " | 4,6 | 3 | " | olive-brown |
| 27 | " | " | " | H | " | 6 | 4 | " | brown |
| 28 | " | " | " | H | " | 4 | 3 | " | " |
| 29 | Cl | " | " | H | " | 3,6 | 4 | " | olive-brown |
| 30 | " | " | " | H | " | 3,6 | 4 | " | brown |
| 31 | " | " | " | H | " | 4,6 | 4 | " | " |
| 32 | " | " | " | H | " | 6 | 3 | " | " |
| 33 | " | " | " | H | " | 4 | 4 | " | olive-brown |
| 34 | —NO$_2$ | (3)-NO$_2$ | —SO$_2$—NH$_2$ | H | " | 3,6 | 4 | " | grey-brown |
| 35 | " | " | " | H | —COOH | 3,6 | 3 | " | olive |
| 36 | " | " | " | H | —CH$_3$ | 3,6 | 4 | " | grey-brown |
| 37 | " | " | " | H | " | 4,6 | 4 | " | brown |
| 38 | " | " | " | H | " | 6 | 4 | " | " |
| 39 | " | " | " | H | " | 4 | 3 | " | olive-brown |
| 40 | " | " | —SO$_2$—NHCH$_3$ | H | " | 3,6 | 4 | " | brown |
| 41 | " | " | " | H | " | 3,6 | 4 | " | " |
| 42 | " | " | " | H | " | 4,6 | 4 | " | " |

TABLE 1-continued

| EX. No. | R4 | R5 (position) | R4a | R5a (position) | W | pos. —SO3H on naph. | pos. of —NNB2 | B1 and B2 | Shade on leather |
|---|---|---|---|---|---|---|---|---|---|
| 46 | " | " | " | H | " | 6 | 4 | " | olive-brown |
| 47 | " | " | " | H | " | 4 | 4 | " | " |
| 48 | " | " | " | H | " | 3,6 | 3 | " | olive-brown |
| 49 | " | " | —SO2—NH—C6H5 | H | " | 3,6 | 4 | " | brown |
| 50 | " | " | " | H | " | 4,6 | 4 | " | " |
| 51 | " | " | " | H | " | 6 | 4 | " | " |
| 52 | " | " | " | H | " | 4 | 4 | " | " |
| 53 | " | " | " | H | " | 3,6 | 3 | " | olive-brown |
| 54 | " | " | —SO2—NH—C6H4(COOH) | H | " | 3,6 | 4 | " | brown |
| 55 | " | " | " | H | " | 4,6 | 4 | " | " |
| 56 | " | " | " | H | " | 6 | 4 | " | " |
| 57 | " | " | " | H | " | 4 | 4 | " | " |
| 58 | " | " | " | H | " | 3,6 | 3 | " | olive-brown |
| 59 | " | " | —NO2 | H | " | 3,6 | 4 | " | brown |
| 60 | " | " | " | H | " | 4,6 | 4 |  | " |
| 61 | " | " | " | H | " | 6 | 4 | " | " |
| 62 | " | " | " | H | " | 4 | 4 | " | " |
| 63 | " | " | —SO3H | H | " | 3,6 | 3 | " | olive-brown |
| 64 | " | " | " | H | " | 3,6 | 4 | " | brown |
| 65 | " | " | " | H | " | 4,6 | 4 | " | " |
| 66 | " | " | " | H | " | 6 | 4 | " | " |
| 67 | " | " | —NO2 | H | " | 4 | 4 | " | " |
| 68 | " | " | " | (3)-SO3H | " | 3,6 | 3 | " | olive-brown |
| 69 | " | " | " | " | " | 3,6 | 4 | " | brown |
| 70 | " | " | —SO3H | " | " | 4,6 | 4 | " | " |
| 71 | " | " | " | " | " | 6 | 4 | " | " |
| 72 | " | " | " | " | " | 4 | 4 | " | " |
| 73 | " | " | —NO2 | (3)-NO2 | " | 3,6 | 3 | " | olive-brown |
| 74 | " | " | " | " | " | 3,6 | 4 | " | olive-brown |
| 75 | " | " | " | " | " | 4,6 | 4 | " | " |
| 76 | " | " | " | " | " | 6 | 4 | " | olive-brown |
| 77 | " | " | " | " | " | 4 | 4 | " | " |
| 78 | " | (3)-SO3H | " | H | " | 3,6 | 3 | " | olive-brown |
| 79 | " | " | —NO2 | H | " | 3,6 | 4 | " | brown |

TABLE 1-continued

| EX. No. | R4 | R5 (position) | R4a | R5a (position) | W | pos. —SO3H on naph. | pos. of —NNB2 | B1 and B2 | Shade on leather |
|---|---|---|---|---|---|---|---|---|---|
| 80 | " | " | " | H | " | 4,6 | 4 | " | " |
| 81 | " | " | " | H | " | 6 | 4 | " | " |
| 82 | " | " | " | H | " | 4 | 4 | " | " |
| 83 | —SO3H | " | " | H | " | 3,6 | 3 | " | olive-brown |
| 84 | " | (3)-NO2 | " | H | " | 3,6 | 4 | " | " |
| 85 | " | " | " | H | " | 4,6 | 4 | " | " |
| 86 | " | " | " | H | " | 6 | 4 | " | " |
| 87 | " | " | " | H | " | 4 | 4 | " | " |
| 88 | —NO2 | " | " | H | " | 3,6 | 3 | " | red-brown |
| 89 | " | " | " | (3)-NO2 | " | 3,6 | 4 | " | " |
| 90 | " | " | " | " | " | 4,6 | 4 | " | " |
| 91 | " | " | " | " | " | 6 | 4 | " | " |
| 92 | " | " | " | " | " | 4 | 4 | " | " |
| 93 | " | " | " | " | " | 3,6 | 3 | " | " |
| 94 | " | " | " | H | " | 3,6 | 4 | (pyrazolone with 3-sulfophenyl, H3C, CH3, OH substituents) | brown |
| 95 | " | " | " | H | " | 4,6 | 4 | " | brown |
| 96 | " | " | " | H | " | 6 | 4 | " | brown |
| 97 | " | " | " | H | " | 4 | 4 | " | olive-brown |
| 98 | " | " | —SO3H | H | " | 3,6 | 4 | " | brown |
| 99 | " | " | " | H | " | 4,6 | 4 | " | " |
| 100 | " | " | —NO2 | H | " | 6 | 4 | " | " |
| 101 | " | " | " | H | " | 4 | 4 | " | olive-brown |
| 102 | " | " | " | (3)-SO3H | " | 3,6 | 3 | " | brown |
| 103 | " | " | " | " | " | 3,6 | 4 | " | " |
| 104 | " | " | —SO3H | " | " | 4,6 | 4 | " | " |
| 105 | " | " | " | " | " | 6 | 4 | " | " |
| 106 | " | " | " | (3)-NO2 | " | 4 | 4 | " | olive-brown |
| 107 | " | " | —NO2 | " | " | 3,6 | 3 | " | brown |
| 108 | " | " | " | " | " | 3,6 | 4 | " | " |
| 109 | " | " | " | " | " | 4,6 | 4 | " | olive-brown |
| 110 | " | " | " | " | " | 6 | 4 | " | brown |
| 111 | " | " | " | H | " | 4 | 4 | " | " |
| 112 | " | " | " | H | " | 3,6 | 3 | " | olive-brown |
| 113 | " | (3)-SO3H | " | H | " | 3,6 | 4 | " | brown |
| 114 | " | " | " | H | " | 4,6 | 4 | " | " |
| 115 | " | " | " | H | " | 6 | 4 | " | olive-brown |
| 116 | " | " | " | H | " | 4 | 4 | " | brown |
| 117 | " | " | " | H | " | 3,6 | 3 | " | " |
| 118 | " | (3)-NO2 | " | H | " | 3,6 | 4 | " | olive-brown |
| 119 | —SO3H | " | " | H | " | 4,6 | 4 | " | " |
| 120 | " | " | " | H | " | 6 | 4 | " | brown |
| 121 | " | " | " | H | " | 4 | 4 | " | " |
| 122 | " | " | " | H | " | 3,6 | 4 | " | " |
| 123 | " | " | " | H | " | 3,6 | 3 | " | olive-brown |

TABLE 1-continued

| EX. No. | R$_4$ | R$_5$ (position) | R$_{4a}$ | R$_{5a}$ (position) | W | pos. —SO$_3$H on naph. | pos. of —NNB$_2$ | B$_1$ and B$_2$ | Shade on leather |
|---|---|---|---|---|---|---|---|---|---|
| 124 | H | (4)-NO$_2$ | H | (4)-NO$_2$ | " | 3,6 | 4 | H$_3$C—[pyrazolone with N-N, phenyl, OH, methyl] | dark-brown |
| 125 | —NO$_2$ | (3)-NO$_2$ | Cl | H | " | 3,6 | 4 | " | brown |
| 126 | " | " | Cl | H | " | 4,6 | 4 | " | brown |
| 127 | " | " | Cl | H | " | 6 | 4 | " | " |
| 128 | " | " | Cl | H | " | 4 | 4 | " | olive |
| 129 | " | " | Cl | H | " | 3,6 | 3 | " | dark-brown |
| 130 | H | (4)-NO$_2$ | H | (4)-NO$_2$ | " | 3,6 | 4 | " | " |
| 131 | Cl | " | H | " | " | 3,6 | 4 | " | " |
| 132 | —NO$_2$ | " | Cl | " | " | 3,6 | 4 | " | " |
| 133 | —SO$_2$—NH$_2$ | H | —NO$_2$ | H | —COOH | 3,6 | 4 | " | " |
| 134 | H | (4)-NO$_2$ | H | " | —CH$_3$ | 3,6 | 4 | HOOC—[pyrazolone with N-N, phenyl, OH, methyl] | " |
| 135 | —NO$_2$ | " | Cl | " | " | 3,6 | 4 | " | " |
| 136 | Cl | " | H | " | " | 3,6 | 4 | " | " |
| 137 | —NO$_2$ | (3)-NO$_2$ | —NO$_2$ | " | —COOH | 3,6 | 4 | " | " |
| 138 | " | " | " | H | —CH$_3$ | 3,6 | 4 | " | brown |
| 139 | " | " | " | H | " | 4,6 | 4 | HO—[benzene]—OH | " |
| 140 | " | " | " | H | " | 6 | 4 | " | " |
| 141 | " | " | " | H | " | 4 | 4 | " | " |
| 142 | " | " | " | H | " | 3,6 | 4 | " | " |
| 143 | " | " | " | H | " | 3,6 | 4 | " | " |
| 144 | " | " | " | H | " | 4,6 | 4 | H$_2$N—[benzene]—NH$_2$ | " |
| 145 | " | " | " | H | " | 6 | 4 | " | " |
| 146 | " | " | " | H | " | 4 | 4 | " | " |
| 147 | " | " | " | H | " | 3,6 | 3 | " | olive |

TABLE 1-continued
| EX. No. | $R_4$ | $R_5$ (position) | $R_{4a}$ | $R_{5a}$ (position) | W | pos. —SO$_3$H on naph. | pos. of —NNB$_2$ | B$_1$ and B$_2$ | Shade on leather |
|---|---|---|---|---|---|---|---|---|---|
| 148 | " | " | " | H | " | 3,6 | 4 |  | brown |
| 149 | " | " | " | H | " | 4,6 | 4 | " | " |
| 150 | " | " | " | H | " | 6 | 4 | " | " |
| 151 | " | " | " | H | " | 4 | 4 | " | olive |
| 152 | " | " | " | H | " | 3,6 | 3 | " | " |
| 153 | " | " | " | H | " | 3,6 | 4 | 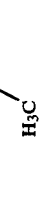 | " |
| 154 | " | " | " | H | " | 4,6 | 4 | " | " |
| 155 | " | " | " | H | " | 6 | 4 | " | " |
| 156 | " | " | " | H | " | 4 | 4 | " | " |
| 157 | " | " | " | H | " | 3,6 | 3 | " | " |
| 158 | " | " | " | H | " | 3,6 | 4 | (3,5-dimethyl-hydroxyphenyl) | " |
| 159 | " | " | " | H | " | 4,6 | 4 | " | " |
| 160 | " | " | " | H | " | 6 | 4 | " | " |
| 161 | " | " | " | H | " | 4 | 4 | " | " |
| 162 | " | " | " | H | " | 3,6 | 3 | " | " |
| 163 | " | " | " | H | " | 3,6 | 4 | 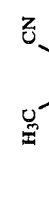 | brown |
| 164 | " | " | " | H | " | 4,6 | 4 | " | " |
| 165 | " | " | " | H | " | 6 | 4 | " | " |
| 166 | " | " | " | H | " | 4 | 4 | " | " |
| 167 | " | " | " | H | " | 3,6 | 3 | " | olive-brown |

TABLE 1-continued

| EX. No. | $R_4$ | $R_5$ (position) | $R_{4a}$ | $R_{5a}$ (position) | W | pos. —$SO_3H$ on naph. | pos. of —$NNB_2$ | $B_1$ and $B_2$ | Shade on leather |
|---|---|---|---|---|---|---|---|---|---|
| 168 | " | " | " | H | $CH_3$ | 3,6 | 4 | (structure: pyridone with $H_3C$, CN, $CH_3$, HO, N—$CH_2$—$CH_2$—$CH_2$—$CH_3$) | brown |
| 169 | " | " | " | H | " | 3,6 | 4 | (structure: pyridone with $H_3C$, $SO_3H$, $CH_3$, HO, N—$CH_3$) | " |
| 170 | " | " | " | H | " | 4,6 | 4 | " | " |
| 171 | " | " | " | H | " | 6 | 4 | " | " |
| 172 | " | " | " | H | " | 4 | 3 | " | brown |
| 173 | H | (4)-$NO_2$ | H | H | " | 3,6 | 4 | " | yellowish |
| 174 | —$NO_2$ | (3)-$NO_2$ | — | — | " | 3,6 | 4 | " | dark-brown |
| 175 | —$NO_2$ | (3)-$NO_2$ | — | — | " | 3,6 | 4 | " | dark-brown |
| 176 | " | " | —$NO_2$ | H | " | 3,6 | 4 | (structure: triazine with HO, OH, OH, $CH_3$) | " |
| 177 | " | " | " | H | " | 4,6 | 4 | " | brown |
| 178 | " | " | " | H | " | 6 | 4 | " | " |
| 179 | " | " | " | H | " | 4 | 3 | " | olive-brown |
| 180 | " | " | " | H | " | 3,6 | 4 | " | dark-brown |
| 181 | " | " | " | — | " | 3,6 | 4 | " | " |
| 182 | H | (4)-$NO_2$ | H | (4)-$NO_2$ | " | 3,6 | 4 | " | " |
| 183 | —$NO_2$ | (3)-$NO_2$ | —$NO_2$ | H | " | 3,6 | 4 | (structure: quinoline with $CH_3$, OH, N) | " |

TABLE 1-continued

| EX. No. | R$_4$ | R$_5$ (position) | R$_{4a}$ | R$_{5a}$ (position) | W | pos. —SO$_3$H on naph. | pos. of —NNB$_2$ | B$_1$ and B$_2$ | Shade on leather |
|---|---|---|---|---|---|---|---|---|---|
| 184 | " | " | " | H | —CH$_3$ | 4,6 | 4 | " | " |
| 185 | " | " | " | H | " | 6 | 4 | " | " |
| 186 | " | " | " | H | " | 4 | 4 | " | " |
| 187 | " | " | — | — | " | 3,6 | 3 | " | " |
| 188 | H | (4)-NO$_2$ | H | H | " | 3,6 | 4 | " | " |
| 189 | —NO$_2$ | (3)-NO$_2$ | " | (4)-NO$_2$ | " | 3,6 | 4 | " | " |
| 190 | —NO$_2$ | " | —NO$_2$ | H | " | 3,6 | 4 | 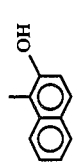 | violet-brown |
| 191 | " | " | " | H | " | 4,6 | 4 | " | " |
| 192 | " | " | " | H | " | 6 | 4 | " | " |
| 193 | " | " | " | H | " | 4 | 4 | " | " |
| 194 | " | " | " | H | " | 3,6 | 3 | " | " |
| 195 | " | " | " | H | " | 3,6 | 4 | 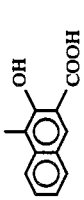 | " |
| 196 | " | " | " | H | " | 4,6 | 4 | " | " |
| 197 | " | " | " | H | " | 6 | 4 | " | " |
| 198 | " | " | " | H | " | 4 | 4 | " | " |
| 199 | " | " | " | H | " | 3,6 | 4 | " | " |
| 200 | " | " | " | H | " | 3,6 | 4 | 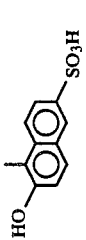 | " |
| 201 | —SO$_2$—NH$_2$ | H | " | H | " | 3,6 | 4 | 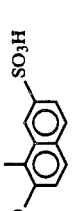 | " |
| 202 | " | H | —SO$_2$—NH$_2$ | H | " | 3,6 | 4 | 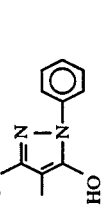 | dark-brown |
| 203 | " | H | —NO$_2$ | (3)-NO$_2$ | " | 3,6 | 4 | " | " |
| 204 | —SO$_2$—NHCH$_3$ | H | —SO$_2$—NH—CH$_3$ | H | " | 3,6 | 4 | " | " |
| 205 | " | H | —NO$_2$ | (3)-NO$_2$ | " | 3,6 | 4 | " | " |

TABLE 1-continued
| EX. No. | R4 | R5 (position) | R4a | R5a (position) | W | pos. —SO3H on naph. | pos. of —NNB2 | B1 and B2 | Shade on leather |
|---|---|---|---|---|---|---|---|---|---|
| 206 | —SO2—NH—C6H5 | H | | | | | | | " |
| 207 | —SO2—NH—C6H4-COOH | H | —SO2—NH—C6H5 | H | | 3,6 | 4 | | " |
| 208 | —SO2—NHCH3 | H | —SO2—NH—C6H4-COOH | H | | 3,6 | 4 | | " |
| 209 | | H | —NO2 | H | | 3,6 | 4 | | " |
| 210 | —SO2—NH—C6H5 | H | " | H | | 3,6 | 4 | | " |
| 211 | —SO2—NH—C6H4-COOH | H | " | H | | 3,6 | 4 | | " |
| 212 | —NO2 | (3)-NO2 | " | H | | 3,6 | 4 |  | " |
| 213 | " | " | — | (3)-SO3H | —SO3H | 3,6 | 4 | | " |
| 214 | " | " | —NO2 | H | —COOH | 3,6 | 4 |  | " |
| 215 | " | " | " | H | —CH3 | 3,6 | 4 | | " |
| 216 | " | " | " | H | " | 3,6 | 4 |  | brown |

TABLE 1-continued
| EX. No. | R₄ | R₅ (position) | R₄ₐ | R₅ₐ (position) | W | pos. —SO₃H on naph. | pos. of —NNB₂ | B₁ and B₂ | Shade on leather |
|---|---|---|---|---|---|---|---|---|---|
| 217 | " | (3)-SO₃H | " | H | —COOH | 3,6 | 4 | 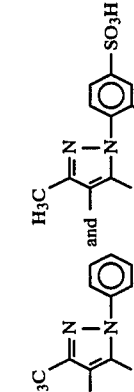 | " |
| 218 | —SO₃H | (3)-NO₂ | " | H | " | 3,6 | 4 | 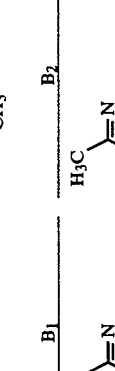 | " |
| 219 | —NO₂ | " | " | H | —CH₃ | 3,6 | 4 |  B₁ and B₂ | brown |
| 220 | " | " | — | — | " | 3,6 | 4 | " | dark-brown |
| 221 | " | " | —NO₂ | H | " | 3,6 | 4 |  | olive |
| 222 | " | " | " | H | " | 3,6 | 4 | 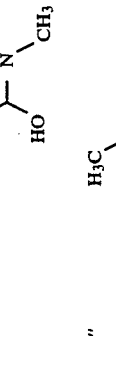 | brown |
| 223 | " | " | " | H | —COOH | 3,6 | 4 |  | brown |

TABLE 1-continued

| EX. No. | R$_4$ | R$_5$ (position) | R$_{4a}$ | R$_{5a}$ (position) | W | pos. —SO$_3$H on naph. | pos. of —NNB$_2$ | B$_1$ and B$_2$ | Shade on leather |
|---|---|---|---|---|---|---|---|---|---|
| 224 | " | " | " | (3)-SO$_3$H | " | 3,6 | 4 | ![B1: H3C-pyrazole-N-C6H4-SO3H with OH; B2: H3C-pyrazole-N-phenyl with OH] | " |
| 225 | " | " | " | H | " | 3,6 | 4 | ![B1: H3C-pyrazole-N-(2,6-dichlorophenyl) with OH; B2: H3C-pyrazole-N-C6H4-SO3H with OH] | " |

In Table 1 "naph" refers to naphthylene group.
In the Table Example 1 is designated brown so that differentiation can be made between yellowish brown colours. An example in the table designated as yellowish brown is, therefore, a yellower brown than that of Example 1 and an Example designated brown is the same or very close in colour to that of Example 1.

EXAMPLES 226 TO 229

Compounds of Examples 226 to 229 are of the formula

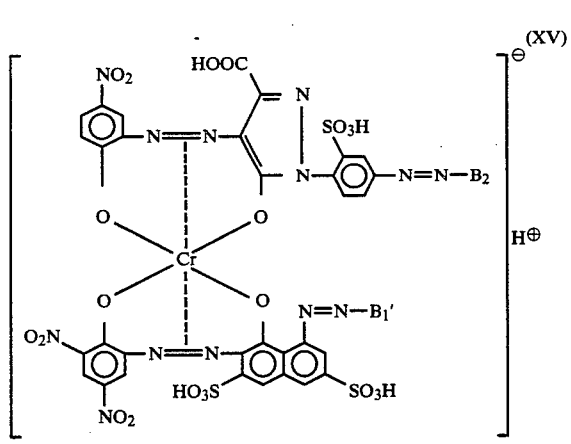

in which the symbols are defined in Table 2 below and may be prepared by a method analogous to that of Example I.

| Example No. | $B_1$ and $B_2$ | shade on leather |
|---|---|---|
| 226 | H₃C–C(=N–N(–C₆H₅))–CH=C(OH)– | dark-brown |
| 227 | H₃C–C(=N–N(–C₆H₄–SO₃H))–CH=C(OH)– | dark-brown |
| 228 | H₃C–C(SO₃H)=C(=O)–N(H)–C(OH)= | olive |
| 229 | 4-methyl-8-hydroxyquinolin-yl | dark red-brown |

DYEING EXAMPLE A

100 Parts of freshly tanned and neutralised chrome leather are tumbled for 30 minutes in a vessel with a dyebath of 250 parts water at 60° C. and 1 part of the dyestuff of Example 1 (in salt form) and then treated in the same bath for 30 minutes with 2 parts of an anionic fatty liquor based on sulphonated train oil. The pH of the dyebath is brought to 3.5 to 5 by the addition of formic acid, and the leather is further tumbled for 30 minutes in the bath. The leather is then dried and prepared in the normal way giving leather evenly dyed with a yellowish dark brown nuance.

DYEING EXAMPLE B

100 Parts of a chrome tanned and dried cow hide (furniture nappa) is tumbled for 60 minutes in a dyebath containing 800 parts of water at 50° C., 2 parts of ammonia and 0.5 parts of a non-ionic wetting agent.

In a fresh bath of 800 parts water at 50° C., 2 parts of ammonia and 2 parts of a non-ionic fatty liquor, 100 parts of the above wetted cow hide is tumbled for 10 minutes. A dyestuff solution of 8 parts of the complex of Example 1, dissolved in 80 parts of water at 65° C., is added to the above bath and dyeing is carried out until the dye penetrates and dyes the leather completely through. This dyeing lasts about 60 to 90 minutes. After these 60 to 90 minutes (i.e. when a cross sectional cut of the leather shows that the dye has penetrated the leather thoroughly) 2 parts of formic acid is added, the leather is tumbled for 15 minutes and, after adding 3 parts of formic acid, is tumbled for a further 30 minutes.

After a short washing process of 10 minutes with 1000 parts of water at 30° C., the leather is hang dried, conditioned staked and toggled. A yellowish dark brown dyed leather results with good fastness properties.

In either of Dyeing Examples A and B, instead of the dyestuff of Example 1, an equivalent amount of any one of Examples 2 to 229 may be used.

What is claimed is:

1. A complex of the formula

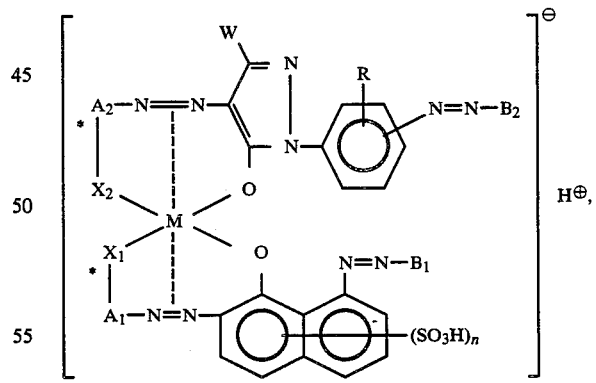

or a salt thereof, wherein $-A_1-X_1-$ is

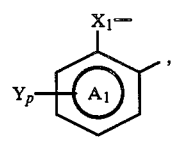

and $-A_2-X_2-$ is

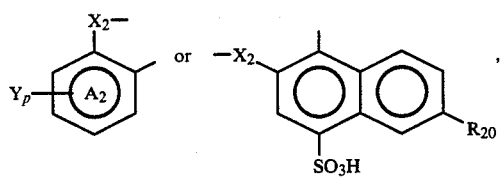

wherein
R_{20} is hydrogen or nitro,
X_1 is —O— or

—CO—O—, wherein the * indicates the atom attached to A_1, with the proviso that X_1 is ortho to the —N═N— radical attached to A_1,
X_2 is —O— or

—CO—O—, wherein the * indicates the atom attached to A_2, with the proviso that X_2 is ortho to the —N═N— radical attached to A_2,
each Y is independently halo, nitro, carboxy, $C_{1-4}$alkyl, $C_{1-4}$alkoxy, sulfo or —SO_2NR_1R_2,
wherein
R_1 is hydrogen or $C_{1-4}$alkyl, and
R_2 is hydrogen, $C_{1-4}$alkyl or wherein R_3 is hydrogen, halo, $C_{1-4}$alkyl, $C_{1-4}$alkoxy, or carboxy, with the proviso that not more than one Y on ring A_1 is a member of the group consisting of sulfo and —SO_2NR_1R_2 and not more than one Y on ring A_2 is a member of the group consisting of sulfo and —SO_2NR_1R_2, and
p is 0, 1 or 2,
each of B_1 and B_2 is independently

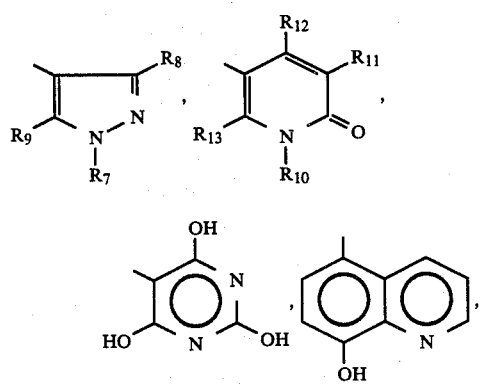

-continued

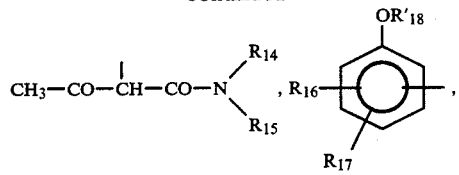

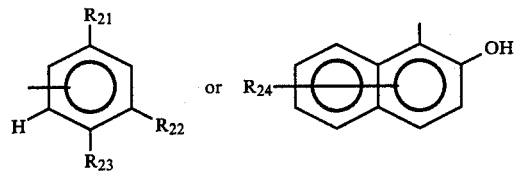

wherein
R_7 is hydrogen,

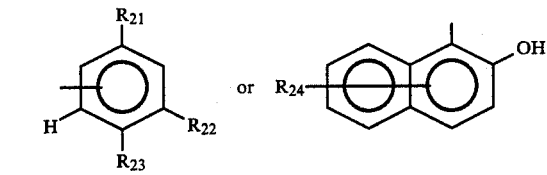

wherein
R_{6a} is hydrogen, chloro, methyl, methoxy, cyano, nitro, carboxy, —SO_2N(R_{7a})_2 or sulfo, wherein each R_{7a} is independently hydrogen, $C_{1-4}$alkyl or $C_{2-4}$alkyl monosubstituted in the 2-, 3- or 4-position by hydroxy or $C_{1-4}$alkoxy, and
R_{6b} is hydrogen, chloro, methyl, methoxy or carboxy,
R_8 is $C_{1-4}$alkyl, phenyl, carboxy or —CON(R_{7a})_2, wherein each R_{7a} is independently hydrogen, $C_{1-4}$alkyl or $C_{2-4}$alkyl monosubstituted in the 2-, 3- or 4-position by hydroxy or $C_{1-4}$alkoxy,
R_9 is amino or hydroxy,
R_{10} is hydrogen; amino, phenylamino; $C_{1-8}$alkyl; $C_{2-4}$alkyl monosubstituted in the 2-, 3- or 4-position by hydroxy, methoxy, ethoxy, chloro or sulfo; cyclohexyl; cyclohexyl substituted by 1, 2 or 3 $C_{1-4}$alkyl groups, the total number of carbon atoms in the substituted cyclohexyl group being 7 to 10, inclusive; carboxy($C_{1-4}$alkyl);

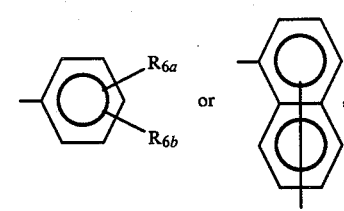

wherein R_{6a} and R_{6b} are as defined above,
R_{11} is hydrogen, carboxy, sulfo, acetyl or cyano,
R_{12} is hydrogen, hydroxy, methyl, carboxy, phenyl or sulfomethyl,
R_{13} is hydrogen, hydroxy or methyl, with the proviso that at least one of R_{12} and R_{13} is hydroxy,
R_{14} is hydrogen or $C_{1-4}$alkyl, $R_{15}$ is $C_{1-8}$alkyl; cyclohexyl; cyclohexyl substituted by 1, 2 or 3 $C_{1-4}$alkyl groups, the total number of carbon atoms in the substituted cyclohexyl group being 7 to 10, inclusive;

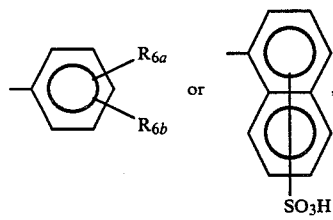

wherein $R_{6a}$ and $R_{6b}$ are as defined above,
$R_{16}$ is hydrogen, $C_{1-4}$alkyl, $C_{1-4}$alkoxy or halo,
$R_{17}$ is hydrogen or $C_{1-4}$alkyl,
$R_{18}'$ is hydrogen, $C_{1-4}$alkyl, ($C_{1-4}$alkyl)carbonyl, benzoyl, phenylsulfonyl or tolylsulfonyl,
$R_{21}$ is amino or hydroxy,
$R_{22}$ is amino or hydroxy,
$R_{23}$ is hydrogen or methyl, with the proviso that $R_{23}$ may be methyl only when $R_{21}$ and $R_{22}$ are both amino, and
$R_{24}$ is hydrogen, 3-carboxy or sulfo,
R is hydrogen or sulfo,
W is methyl or carboxy,
M is iron, cobalt or chromium, and
n is 1 or 2,
wherein each halo is independently fluoro, chloro, bromo or iodo.

2. A complex according to claim 1, or salt thereof each cation of which is independently a nonchromophoric cation.

3. A complex according to claim 2, or a salt thereof each cation of which is independently an alkali metal cation, an alkaline earth metal cation or $N^{\oplus}(R_{25})_4$, wherein each $R_{25}$ is independently hydrogen, $C_{1-3}$alkyl or 2-, 3- or 4-hydroxy($C_{2-4}$alkyl), with the proviso that when any $R_{25}$ is 2-, 3- or 4-hydroxy($C_{2-4}$alkyl), at least one $R_{25}$ is hydrogen.

4. A complex according to claim 3, or a salt thereof each cation of which is independently lithium, sodium, potassium, magnesium, calcium, ammonium, methylammonium, dimethylammonium, trimethylammonium, tetramethylammonium, ethylammonium, diethylammonium, triethylammonium, ethanolammonium, diethanolammonium, triethanolammonium, isopropanolammonium, diisopropanolammonium or triisopropanolammonium.

5. A complex according to claim 4, or a salt thereof each cation of which is independently lithium, sodium, potassium or ammonium.

6. A complex according to claim 5, or a salt thereof each cation of which is sodium.

7. A complex according to claim 2 having the formula

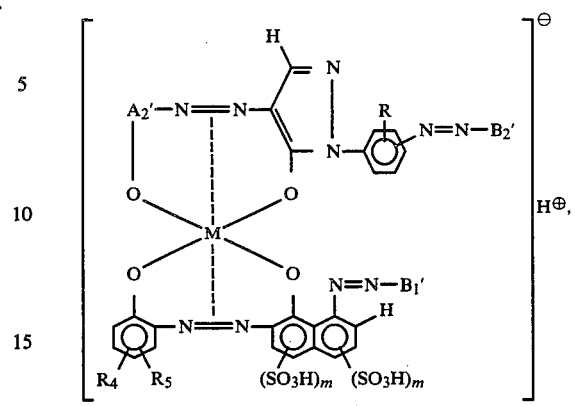

or a salt thereof each cation of which is independently a non-chromophoric cation, wherein

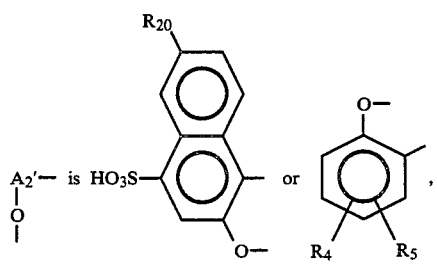

wherein
$R_{20}$ is hydrogen or nitro, and
$R_4$ and $R_5$ are as defined below,
each of $B_1'$ and $B_2'$ is independently

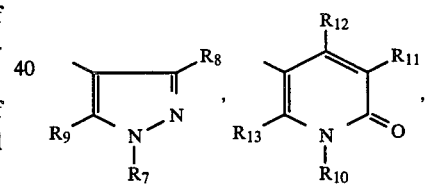

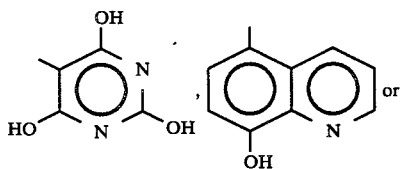

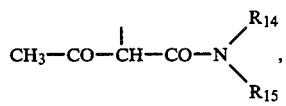

$R_4$ is hydrogen, chloro, nitro, sulfo or $-SO_2NR_1'R_2'$, wherein
$R_1'$ is hydrogen or methyl, and
$R_2'$ is hydrogen, methyl or

wherein R₃' is hydrogen, chloro, methyl, methoxy or carboxy,

R₅ is hydrogen, chloro, nitro, sulfo or carboxy, with the proviso that not more than one of R₄ and R₅ is a member of the group consisting of sulfo and —SO₂NR₁'R₂', and each m is independently 0 or 1, with the proviso that at least one m is 1.

8. A complex according to claim 7 having the formula $$\left[\text{(chromium complex structure with } R_4, R_5, CH_3, B_1'', B_2'' \text{ groups)}\right]^{\ominus} H^{\oplus},$$

or a salt thereof each cation of which is independently a non-chromophoric cation, wherein each of $B_1''$ and $B_2''$ is independently (pyrazole structure with $R_7, R_8, R_9$), (pyridone structure with $R_{10}, R_{11}, R_{12}, R_{13}$), (pyrimidine-diol structure) or (8-hydroxyquinoline structure)

9. A complex according to claim 8 having the formula $$\left[\text{(chromium complex structure with } R_{4a'}, R_{5a'}, R_{4b'}, R_{5b'}, CH_3, B_1'', R_2''' \text{ groups)}\right]^{\ominus} H^{\oplus},$$

or a salt thereof each cation of which is independently a non-chromophoric cation, wherein each of $B_1'''$ and $B_2'''$ is independently (hydrazone phenyl structure with $R_{8'}, R_{6a'}$) or (pyridone structure with $CH_3, R_{11'}, R_{10''}$), wherein $R_{6a'}$ is hydrogen, chloro, nitro or sulfo, $R_{8'}$ is methyl or carboxy, $R_{10''}$ is hydrogen or $C_{1-4}$alkyl, and $R_{11'}$ is cyano or sulfo, each of $R_{4a'}$ and $R_{4b'}$ is independently chloro, sulfo, nitro or —SO₂NR₁'R₂', and each of $R_{5a'}$ and $R_{5b'}$ is independently hydrogen, nitro or sulfo, with the provisos that (i) not more than one of $R_{4a'}$ and $R_{4b'}$ is sulfo, (ii) not more than one of $R_{5a'}$ and $R_{5b'}$ is sulfo, (iii) when $R_{4a'}$ is —SO₂NR₁'R₂', $R_{5a'}$ is hydrogen, and when $R_{4b'}$ is —SO₂NR₁'R₂', $R_{5b'}$ is hydrogen, and (iv) when $R_{4a'}$ is sulfo, $R_{5a'}$ is hydrogen or nitro, and when $R_{4b'}$ is sulfo, $R_{5b'}$ is hydrogen or nitro.

10. A complex according to claim 9, or a salt therof each cation of which is independently a non-chromophoric cation, wherein each of $B_1''''$ and $B_2''''$ is independently (hydrazone phenyl structure with OH, CH₃, (SO₃H)$_{n'}$), wherein n' is 0 or 1.

11. The complex according to claim 10, or a salt thereof each cation of which is independently a non-chromophoric cation, wherein $R_{4a'}$ is nitro, $R_{4b'}$ is nitro, $R_{5a'}$ is hydrogen, $R_{5b'}$ is nitro, and each n' is 0.

12. The complex according to claim 11 in sodium salt form.

13. The complex according to claim 10, or a salt thereof each cation of which is independently a non-chromophoric cation, wherein $R_{4a'}$ is nitro, $R_{4b'}$ is nitro, $R_{5a'}$ is hydrogen, $R_{5b'}$ is nitro, $B_1'''$ is

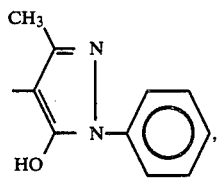

and $B_2'''$ is

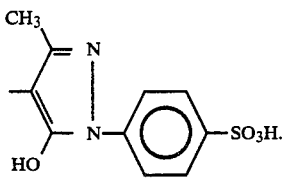

14. The complex according to claim 13 in sodium salt form.

15. The complex according to claim 10, or a salt thereof each cation of which is independently a non-chromophoric cation, wherein
   $R_{4a}'$ is sulfo,
   $R_{4b}'$ is nitro,
   $R_{5a}'$ is hydrogen,
   $R_{5b}'$ is nitro, and
   each n' is 0.

16. The complex according to claim 15 in sodium salt form.

17. The complex according to claim 10, or a salt thereof each cation of which is independently a non-chromophoric cation, wherein
   $R_{4a}'$ is nitro,
   $R_{4b}'$ is nitro,
   $R_{5a}'$ is sulfo,
   $R_{5b}'$ is nitro, and
   each n' is 0.

18. The complex according to claim 17 in sodium salt form.

* * * * *